(12) United States Patent
Ghoanneviss et al.

(10) Patent No.: US 8,501,145 B2
(45) Date of Patent: Aug. 6, 2013

(54) METHOD FOR GROWING CARBON NANOWALLS

(76) Inventors: Mahmood Ghoanneviss, Tehran (IR); Parvin Alizadeh Eslami, Tabriz (IR); Saeed Nasiri Laheghi, Tehran (IR)

( * ) Notice: Subject to any disclaimer, the term of this patent is extended or adjusted under 35 U.S.C. 154(b) by 48 days.

(21) Appl. No.: 12/501,433

(22) Filed: Jul. 12, 2009

(65) Prior Publication Data

US 2009/0274610 A1    Nov. 5, 2009

(51) Int. Cl.
*D01F 9/12* (2006.01)
*B01J 8/02* (2006.01)

(52) U.S. Cl.
USPC .................... 423/447.1; 977/742; 422/187

(58) Field of Classification Search
USPC .............. 423/447.1–447.3; 422/187
See application file for complete search history.

(56) References Cited

U.S. PATENT DOCUMENTS

2007/0184190 A1* 8/2007 Hiramatsu et al. ......... 427/249.1

OTHER PUBLICATIONS

Chuang, et al., Three-dimensional carbon nanowall structures, Applied Physics Letters 2007; 90: 123107-1 to 123107-3.*
Wu, et al., Carbon nanowalls and related materials, J. Mater. Chem. 2004; 14: 469-477.*
Chiang, et al., Purification and Characterization of Single-Wall Carbon Nanotubes (SWNTs) Obtained from the Gas-Phase Decomposition of CO (Hipco Process), J. Phys. Chem. B. 2001; 105: 8297-8301.*

* cited by examiner

*Primary Examiner* — Daniel C McCracken
(74) *Attorney, Agent, or Firm* — Barry Choobin; Patent360 LLC

(57) ABSTRACT

A method for growing carbon nanowalls on a base material is disclosed. The method comprises mixing a predetermined amount of a hydrocarbon gas with a predetermined amount of at least one non hydrocarbon gas; placing said base material in a reaction chamber having a first portion and a second portion, first portion is extended from a first end of reaction chamber to first end of base material; creating a radical in reaction chamber which comprises a hydrocarbon radical and a non hydrocarbon radical; applying the radical to the base material; and growing carbon nanowalls on said base material based on said hydrocarbon radical.

11 Claims, 15 Drawing Sheets

METHOD FOR GROWING CARBON NANOWALLS

SPONSORSHIP STATEMENT

The present invention is sponsored by the Iranian National Science Foundation for international filing.

FIELD OF THE INVENTION

The present invention is related to a method for producing nanostructures containing carbon in particular to create nanowalls under an atmospheric pressure without making a vacuum and a plasma.

BACKGROUND OF THE INVENTION

There are kinds of known nanostructures (carbon nanostructures) generally including carbon. Some examples of carbon nanostructures are the Fullerene and the carbon nanotubes. Other carbon nanostructures are called as carbon nanowalls and carbon nanowalls have been produced by a plasma method and also Silicon is applied as a substrate. A method for producing carbon nanowalls involves applying plasma and $CH_4$ and $H_2$. Also Fluorine Hydrocarbons and/or Fluorine and Hydrogen Hydrocarbons are applied.

Some problems should be resolved by the invention.

Some of the documents show that the carbon nanowalls are grown on a silicon substrate. Accordingly, if there is no silicon substrate, the carbon nanowalls cannot be grown. There is no technique for using the non-silicon substrates and a glass as a substrate to grow the carbon nanowalls. Also in the same documents, Fluorine Hydrocarbon gases including Fluorine, Hydrogen, and Carbon is applied. So if there are no Hydrocarbon gases including Fluorine and Hydrogen, it is not possible to make the carbon nanowalls. In this document, there is no technique for applying Hydrocarbon including Hydrogen and carbon and with unsaturated bonds. Also in the same document, plasma and a vacuum are applied and otherwise the carbon nanowalls cannot be grown.

This document shows no technique for using Pyrolysis to grow the carbon nanowalls.

This document indicates no technique for growing and establishing the carbon nanowalls under an atmospheric pressure.

Other document determines that the carbon nanowalls have been grown on a silicon substrate and that an applied catalyst is Iron Nickel. So if the substrate and the catalyst are not Silicon and Iron Nickel respectively, the carbon nanowalls cannot be formed. In the same document there is no technique for using a glass substrate and catalysts such as Iron, copper, Aluminum separately or in thin layers to make the carbon nanowalls.

SUMMARY OF THE INVENTION

Carbon nanowalls can be applied for different functions and are in demand so no method for establishing the carbon nanowalls with high random has been developed; accordingly, the object of the current invention is to provide a method for making the carbon nanowalls. Other object of the current invention is to provide a cost-effective method for making the carbon nanowalls. Other object of the current invention is to provide a method for making the less complex carbon nanowalls and other one is to grow the carbon nanowalls for considering the glass substrate.

Inventors have found that the carbon nanowalls can be established on the glass substrate by feeding Hydrocarbon and non Hydrocarbon gases in a hot chamber and by growing on thin metal films.

Existing invention provides a method for establishing carbon nanowalls. In the same method, there is a hot chamber with hot walls and a space; and a gas including a carbon material and a non carbon diluter is entered into the same chamber. After entering the gas and passing through the hot space, the carbon nanowalls are set on the base substrate and there will be a reaction at the middle of the chamber.

There is a pressure in the hot chamber and the gas passes under an atmospheric pressure and there is no vacuum. An additional gas entered into the hot reaction chamber is gone out. Some effective factors for growing the carbon nanowalls and changing the structures are temperature of the reaction chamber, type of catalyst on the glass substrate, ratio of Hydrocarbon and non hydrocarbon gases and reaction time. This is an advantage by which the carbon nanowalls with special properties (such as thickness, height, growth density, monotony and distribution) are established.

Carbon nanowalls descry substrate as 2 dimensional nanostructures in which a 2_dimensional graphitic is extended and connected to a base material while same nanostructure can be composed of one or more walls. Term '2 dimensional' means that a height and a length of the nanostructure is more than a thickness of the nanostructure. The nanostructure (nanowalls) can be composed of one or 4 more walls or pair of 2-fold layer (there is a space between the layers). The carbon nanowalls have a thickness between 0.05 mm to 40 mm and a length and a height about 100 nm to 10 µm. An example of nanowalls established by the same method is a carbon nanostructure with a wall which is extended in height and length. Fullerenes can be an example of 0 dimensional carbon nanostructures and the carbon nano-tubes are known as 1 dimensional carbon structures. The hot chamber is one which is so warmed that the gases are ionized and make a radical as these enter into the same chamber. In the method, the gases in combination of hydrocarbon and non hydrocarbon gases separately are entered for making a surface ready. The gaseous atoms entered into the chamber are ionized and make a radical by heating the walls and the chamber before accessing the base material. Then materials close to substrate while other gaseous atoms entered into the chamber are ionized and make radical in the reaction region. Then radicals are put and grown on the base material. So a marking is done in the same method: regions where atoms are changed to radical and prepared for the reaction and regions in which carbon nanostructures are established on base materials. These regions are called as radical and reaction respectively. On the other hand, the radical and reaction regions are connected together and are put inside the chamber.

Both the regions are activated by warming around the chamber. To do it, the thermal elements covered by ceramic are employed which make heat by applying electricity. According to a division degree technique (quantity of established radicals) a radical source can be controlled by changing a temperature or an electricity power entered into thermal elements. Other advantage of the same technique is that a feeding speed of the radical sources inside the chamber for growing the carbon nanowalls can be controlled.

The non-carbon radicals entered into a reaction medium include the hydrogen radicals (containing hydrogen radicals or atoms H). The Hydrogen radicals established by a radical source with hydrogen are entered into the reaction region. The gaseous hydrogen (H2) and gaseous Ammonia (NH3) are the examples of a radical source providing the hydrogen radicals.

Appling the hydrogen radicals allow the carbon nanowalls to be formed singly. The presence of radicals OH or oxygen radicals (O) in the reaction chamber prevents to establish the carbon nanowalls.

Source material includes the kind of materials with carbon. Such materials are applied in mixture.

Materials having carbon and hydrogen are employed as carbon source material. Hydrocarbon material used as carbon source material is C2H2.

If material has carbon and hydrogen, C2H2 is used. These carbon nanowalls have irregular location and angles extended vertically so these are suitable for Hydrogen and also for increasing hydrogen storage in the fuel cells.

Authors have found that the characteristics of carbon nanowalls produced by this method are related to the base materials used for growing the carbon nanowalls and also to a catalyst of layer marked on the base material.

The present invention discloses that the characteristics of the carbon nanowalls produced by the present invention can be controlled in nanowalls position, space among them, thickness and their size by changing a flow of a carbon source gas in compared with the other non hydrocarbon gases and also by changing a temperature and a growth time and this leads to invent a method for establishing the carbon nanowalls. The characteristics can be controlled by monitoring a gas flow, a time and a temperature.

Controlling the carbon nanowalls leads to a storing of hydrogen in the fuel cells to complete capacity.

The present invention discloses that by changing the evaluated parameters such as a temperature, a time, a gas flow and a catalyst type and also by changing an amount of carbon material to non-hydrocarbon gas, a type of carbon nanostructure will be changed.

Before growing the carbon nanowalls, a base material is heated and hydrogen (to make radical) is injected into the chamber in which there is a base material so that there are some places on the base material for connecting the carbon nanowalls. This is done for preparing the base material by making porosity on the surface.

In the present invention, the parameters for establishing the carbon nanowalls are controlled in accordance with the density of radicals produced in the reaction chamber. Some examples of controllable conditions based on the radical density are a speed of feeding by the source material, a chamber temperature and a ratio of hydrocarbon gas to non-hydrocarbon one. These conditions are controlled foreground based on the radical density. Accordingly the carbon nanowalls may have effective characteristics.

In the method, base material (glass) is covered by various catalysts in thin layers in nanometer. Catalyst layers are settled on each other in 2 layers or separately. The present invention discloses a method for producing carbon nanowalls on the glass substrate under atmospheric pressure by CVD method. Metal catalysts cause to produce a kind of carbon nanowalls. This method has useful arrangement on the base material (glass). Since 2 dimensional nanostructures (carbon nanowalls) have been developed on the glass base material, these have some advantages and can be applied for different demands. Recent invention provides an apparatus for establishing the carbon nanowalls on the base material which is glass. Experiment is easy and done under atmospheric pressure. The apparatus includes a chamber in which a material is radicalized and the nanostructures are made and a carbon source material and non-carbon materials are entered. Energy source for radicalizing the non-hydrocarbon materials and carbon source material is out of the chamber and this source leads to heat inside the chamber and to make the radical materials. Before entering into the chamber, the materials are mixed together in other one without heat. Additional materials entered into the reaction chamber are driven out under atmospheric pressure. Above mentioned materials are suitable for this method.

DETAILED DESCRIPTION OF THE INVENTION

Figure 1:
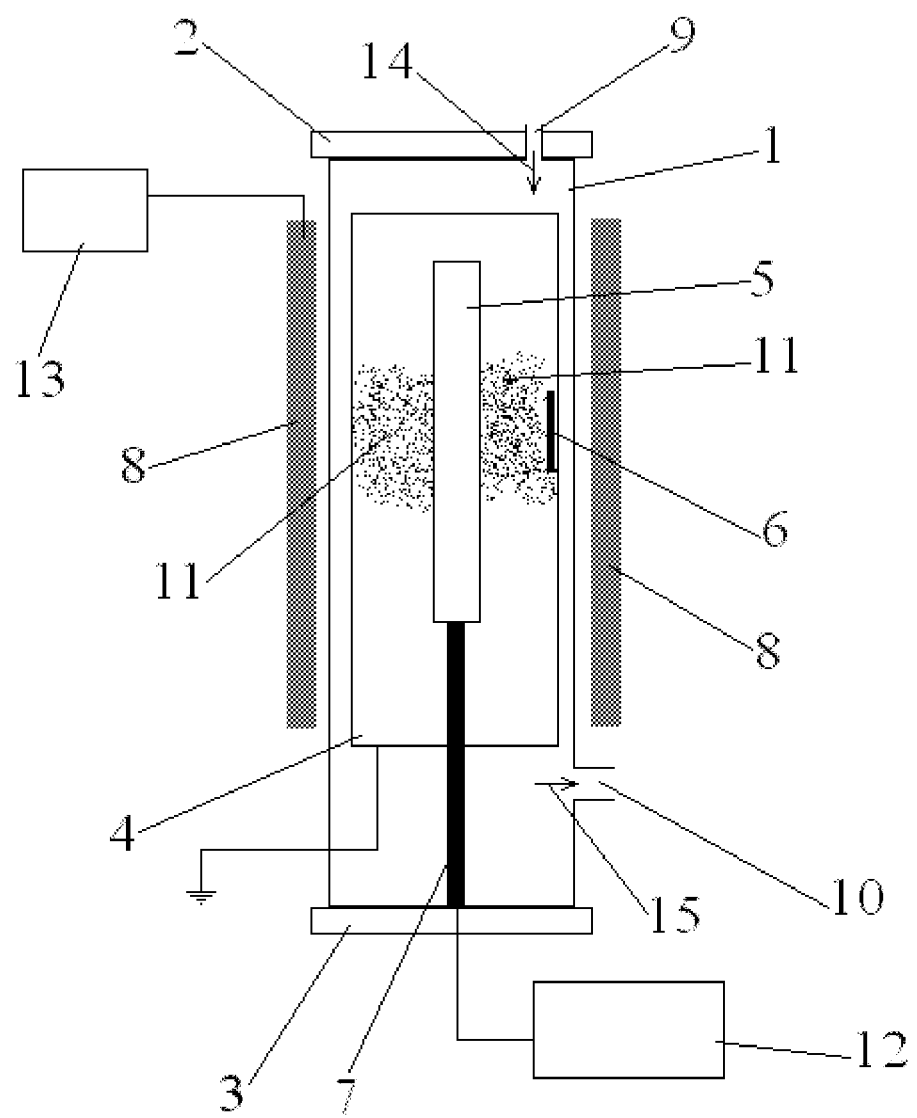
FIG. 1 is a schematic view of an apparatus for coating nano layer on a glass substrate.

The present invention discloses an apparatus which comprises a radical generator which is used for making heat around the chamber and heat is generated by using an electric oven. There will be radical materials by heating the chamber walls and inside the chamber and by contacting between them and walls and by increasing the energy. For example, H2 which is a radical source will be radicalized by contacting with the hot walls and with a surface of base material covered with the metal catalysts. The chamber will be heated up to 300-700° C., especially 500-600° C.

In the apparatus, the reaction chamber is along the radical chamber and the produced radicals are conducted towards the base material covered by the carbon nanowalls and then the unused materials leave the chamber. Base material will be provided inside the reaction chamber. Given the location, the radicalized materials move toward the base material easily and so the materials will be radicalized and reacted so easily. If the carbon nanowalls should be established on a large region, the same location and the apparatus will be so useful and effective.

The system has an apparatus for mixing the gases in which hydrocarbon and non-hydrocarbon gases are entered into and mixed. After mixing the gases, the gas mixture leaves the chamber and is conducted to the reaction chamber.

Amount of radicals (effective for establishing carbon nanowalls), can be controlled by 2 ways. In first one, an amount of gas entered to a gas mixer and to the reaction chamber should be controlled so we can control the amount of radicals. Other way is to control a heat of the chamber which causes to heat outside the chamber. It is better to control the quantity of radicals by mixing both the ways because an over increase or decrease of gas and heat leads to change the nanostructure and to make getting the carbon nanowalls with useful characteristics difficult.

Speed of feeding by non-hydrocarbon materials or heat used for making the radicals of non-hydrocarbon materials especially Hydrogen and Ammonia affects on preparing the surface of the base material positively.

The system for growing carbon nanowalls has 2 separate parts of which first one is employed for mixing used gases where there is no heat. This part is applied for entering non-hydrocarbon and hydrocarbon gases into the reaction chamber to be grown. In next part which is an attached chamber: hydrocarbon and non-hydrocarbon materials are radicalized, the base material and the radicals are reacted and the carbon nanowalls are made on the base material. In this part, gas inside the chamber and also the walls and the base material is heated. Entered gases are radicalized in a mixture or a single.

If it is aimed to provide the surface of the base material (substrate), non-hydrocarbon gas is entered into the system separately. In this case, only non-hydrocarbon gas (H2) is entered into the system and radicalized inside the chamber. After providing the surface, to grow the carbon nanowalls, the hydrocarbon gas as a carbon source and having hydrogen and carbon is entered into the environment along with the non-hydrocarbon gases. In this case, given that an energy of ionization and of making a hydrogen radical is more than H2, before ionization of H2 and making the hydrogen radical, the hydrocarbon gas is ionized and the radicals C are produced. To make a suitable medium and to dilute it for getting the carbon nanowalls with a suitable structure and characteristics, other non-hydrocarbon gas as well as H2 including Nitrogen and Hydrogen are employed. Accordingly, the presence of Nitrogen radicals (N) and Hydrogen radicals (H) causes to dilute the medium and to avoid the oxidation and to form the carbon nanowalls with useful properties.

Radical gases along with the non-radical gases are passed through the reaction chamber located on the middle of the chamber and then the non-reacted gases leave the chamber so there is always a fresh gas in the chamber.

Other part of the invention is related to put the metal catalysts on the base material (glass).

To put the metal catalyst on the glass as the base material, the system works based on a plasma in which the base material will be prepared for growing the carbon nanowalls.

This system has a chamber in which there are 2 concentric cylinders. Internal solid one is applied as a cathode and an external hollow one as an anode.

Materials should be isolated from the cathode and put on the base material. After cleaning, the base material is settled on the anode inside the system and then prepared for marking the layer.

At the same time the system is decreased to a low pressure so that there are no disruptive materials in the chamber.

To create a plasma in the medium for making the layer of metal material as a catalyst on the base material, a desired gas is entered into the system. The gas for establishing the plasma may be Ar or N2, but a mixture of both gases are not applied.

Plasma generator in the same system is to apply a direct current (D.C) by which a plasma is made. To homogenize the plasma in a desired region where there is a base material, a coil cylinder is used as a magnetic field generator.

Homogenizing the plasma in the same region where there is a base material leads to an increased density of the radicals so a contact between the radicals and a target will be increased. In this case, a layer of metal material on the surface of the base material will be marked with an optimum thickness and characteristics.

Cathodes applied as a target for making the layer of metal materials on the base material can be Cu and Al but a mixture and an alloy of same metals are not used.

To make the layer of catalysts and to have a base material on which there are 2 catalyst layers, this system is reused after making the layer of first metal material.

After making the layer, first metal layer of target (cathode) is changed and it is done again so that there is a base material with 2 alternative catalyst layers.

Research and priorities of recent invention will be descry substrate. These technical subjects are same as claims so these are reported together.

All kinds of variables related to carbon source material can be employed for producing the carbon nanowalls. One material including carbon can have other elements such as Hydrogen, Fluorine, Chlorine, Bromine, Oxygen and Nitrogen as well as carbon. Here, a source material including carbon and Hydrogen is selected in which a ratio of carbon to hydrogen is equal and C2H2 is chosen as a source material. Compounds may be linear, branched and circular and here C2H2 is linear. Source gas is used and entered into a mixer under normal temperature. This compound can be used in mixture or separately and now it is employed along with the non-hydrocarbon gases so that the carbon nanowalls can be grown optimally and with suitable parameters.

A good and effective source for making the hydrogen radicals is to apply compounds having hydrogen so H2 is used as a source with only hydrogen and also NH3 with hydrogen and nitrogen. These compounds may be employed in mixture or separately. Separate one is applied to prepare the surface of base material for growing the carbon nanowalls and also mixed one to dilute the medium and avoid an oxidation of the carbon nanowalls and get a desired structure in structural parameters (for example thickness, length and height).

In this method, to establish the carbon nanowalls, a source material of H production is entered into the system lonely and becomes a radical. These radicals contact to the base material inside the chamber and prepare the surface of the base material for growing the carbon nanowalls.

In this method, the materials in determined quantity are entered into the chamber to be mixed together. In the same chamber, there is no heat and terms and parameters will not be changed. Then these are entered into the reaction chamber to become a radical. In the reaction chamber, there are carbon radical materials as well as radicals H and N. Carbon produced by the radical mixture is connected to the base material and produces the carbon nanostructures.

The base material in this invention is glass and a catalyst covers metal materials. In accordance with the method, the carbon nanowalls can be grown on the metal layer. Used catalysts may be Al, Fe or Cu or thin layer. Also these thin layers can be settled on the base material in 2 layers led by different catalysts. Applying each one of metal materials as catalyst can affect the characteristics of the carbon nanowalls and a suitable growth of the carbon nanowalls. Also using same metal nanolayers settled on each other and their location affects on optimum growth of the carbon nanowalls positively.

In the method, different gases are used to make plasma on the base material and may be Ar or N2. Changing a kind of plasma gas can affect on a carbon nanowalls structure and also optimizing the effective parameters of the carbon nanowalls such as length, thickness and width positively.

FIG. 1 shows an apparatus for making the layer of metal materials (catalyst) on the base material. Apparatus 1 includes operation chamber 1 covered with 2 metal plates 2 and 3. There are 2 cylinders as cathode 5 and anode 4 inside it; and anode 4 and cathode 5 is hollow and larger cylinder and solid and smaller one respectively.

In apparatus 1, cathode 5 is connected to electric power source 12 by a base and anode 6 to the ground. Anode and cathode 5 are 2 concentric cylinders located on the reaction chamber 1. A coil of magnetic field generator 8 covers around the reaction chamber 1 and connects to electric feeding source 13. Electric power source 12 is applied for cathode wire 5 and anode 4 to make voltage about 900V and on the other hand magnetic field 5 around the reaction chamber 1 connects to electric source 13 to make magnetic field 400.

In apparatus No 1, cathode 5 and anode 4 are 2 cylinders with length of 200 mm. Anode 4 and cathode 5 are external and hollow cylinder with diameter of 100 mm and internal and solid one with 30 nm respectively. Space between anode 4 and cathode 5 is about 35 mm. While making plasma 11, there is current as much as 120 mA between anode 4 and cathode 5.

The reaction chamber 1 covered by 2 flat plates 2 and 3 is drained by channel 10 connected to vacuum system and materials leave the reaction chamber 1 through path 15 to make primary pressure $10^{-5}$ torr. Then desired gas (Ar or N2) is entered into the apparatus 1 through channel 9 located on the top of the reaction chamber and the middle of upper plate 2. This gas is entered into the space between 2 cylinders (anode 4 and cathode 5) through channel 9 and this continues to reach a pressure of 0.03 ton. In this case, there will be a current of 120 mA between anode 4 and cathode 5 by making a voltage about 90 volts.

In apparatus No 1, base material 6 (substrate) is settled on the anode 4 in the space between anode 4 and cathode 5. Base material 6 is so settled that its upper part is toward cathode 5, base material 6 (substrate) is made of microscopic glass in dimension of 10 mm×10 mm×0.9 mm. Before putting base material 6 in apparatus No 1, it is cleaned by solvents such as Ethanol, Acetone and water without ion and by using ultrasonic waves during 10 minutes.

In apparatus No 1, Bby making a voltage of 900 V for cathode 5 and by making plasma 11 in the region between anode 4 and cathode 5 during 3 minutes, there will be a current of 120 mA. At same time, metal materials on the cathode 5 are removed and settled on the base material 6 which is located on the anode 4.

In this invention, to mark the layer of different metal materials, anode 4 and cathode 5 is applied. Therefore in apparatus No 1, anode 4 and cathode 5, Fe, Cu, and Al are applied. The layer of each one of metal materials is marked on the base material 6.

To get base material 6 (substrate) with 2 different layers, a layer of metal materials (catalyst) is made for two times. In this case, on the base material 6 (substrate) made of glass, a metal layer as catalyst is made and then by applying apparatus No 1 and by changing anode 4 and cathode 5, a second layer on the first one is made. The second layer of metal materials is different from previous one. At the same time, a layer of different metals such as Al, Fe, and Cu is made. So we have six base materials (substrate) which are made in two layers (Cu—Al-glass, Cu—Fe-glass, Al—Cu-glass, Fe—Cu-glass, and Fe—Al-glass). So there will be nine made base materials as well as metal materials.

In this invention, to make the layer of metal materials on the base material 6, a blank will be made between anode 4 and cathode 5 through which Ar and or N2 is entered into the reaction chamber 1. On the other word, marking the layer of metal materials on the base material 6 has been done in plasma 11 Argon for one time and in plasma 11 nitrogen for other one. Accordingly, we will have two base materials 6 covered with metal materials as catalyst of which one is made in the presence of plasma Ar and other in the presence of plasma N2.

In this invention, to grow the carbon nanowalls, used hydrocarbon gases as carbon source and non-hydrocarbon as diluting gases are mixed together inside the apparatus No. 2 so that these are entered into apparatus No. 3 for growing the carbon nanostructures.

Figure 2:
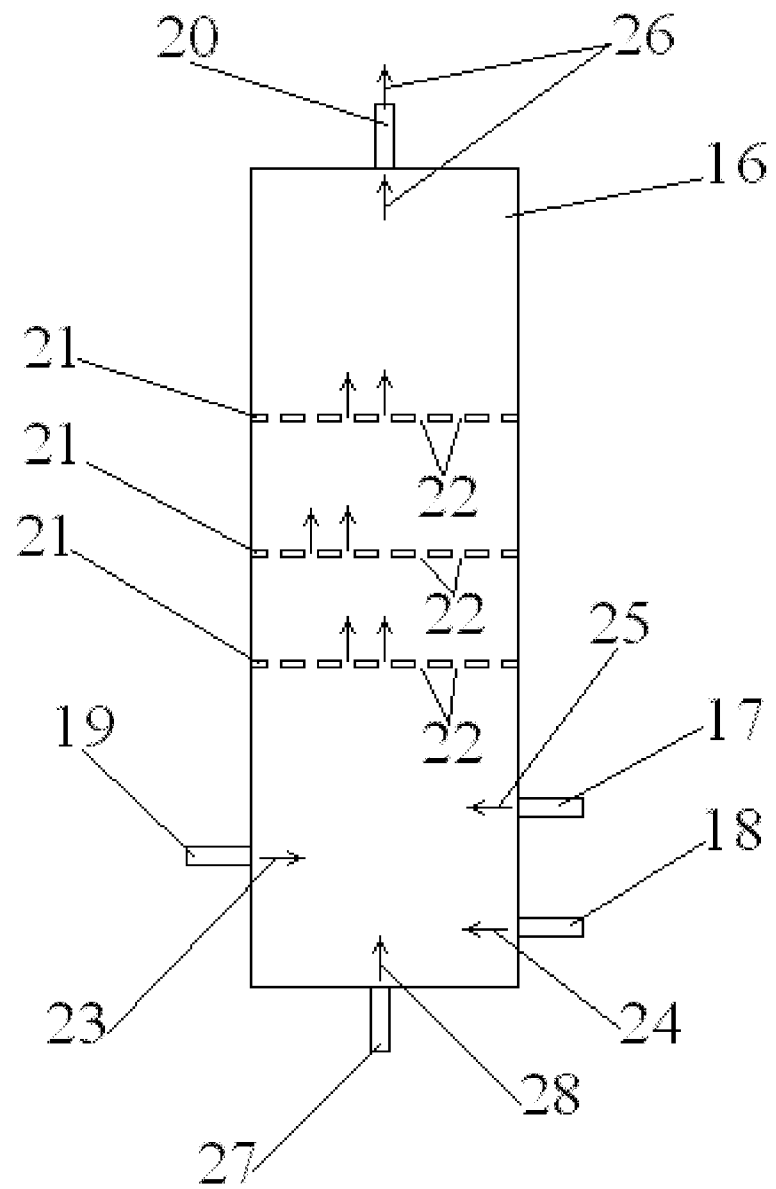
FIG. 2 is a schematic view of an apparatus for mixing the gases.
Figure 3:
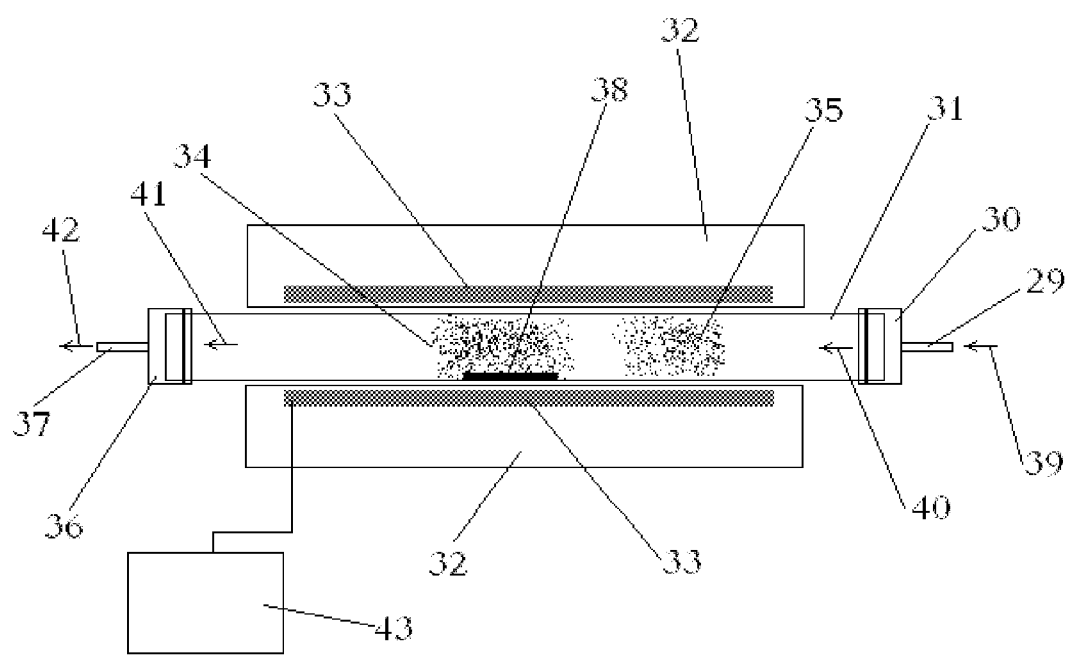
FIG. 3 is a schematic view of an apparatus for growing the carbon nanostructures.

FIG. 2 shows a set for mixing gases before entering into a special carbon nanostructure set composed of a cylinder chamber 16. In this chamber, there is no thermal and chemical operation. Gases are entered into the mixer chamber 16 through special ports 17, 18, 19, and 27. Gases are entered into the mixer chamber through special ports 17, 18, 19, and 27, also through paths 23, 24, 25, and 28.

In the mixer chamber 16, there are 3 porous plates 21 on which there are many tiny pores 22 so that gases entered through special ports 17, 18, 19, and 27 are mixed together in small quantity and then by leaving the mixer chamber 16 through special port 20, they are mixed completely. Path of entered gases 23, 24, 25, and 28 is so that these are contacted together mutually to be mixed together. Porous plates 21 with many tiny pores help the mixture.

Apparatus No. 2 just mixes the hydrocarbon gases (C2H2) and non-hydrocarbon gases (H2 and NH3) which are entered into the mixer chamber 16 through special ports 17, 18, 19, and 27; and gases leave the chamber in mixture C2H2/NH3/H2 thorough special port 20. If the surface of base material 6 is prepared inside the apparatus No 3, only one or two kinds of gas (NH3 and H2) are entered into apparatus No. 2. In first one, only one gas (H2) is entered and in second, two gases (NH3 and H2) are entered into apparatus No. 2 and the mixer chamber 16. So mixture of gases NH3/H2 leaves the chamber through special port 20 after mixing in the mixer chamber 16.

In the mixer chamber 16, apparatus No. 2 is under atmospheric pressure, in other word there is no vacuum.

In this invention, to grow carbon nanostructures, apparatus No. 3 is applied. Apparatus No. 3 includes main chamber 31 as quartz cylinder in diameter of 10 cm and length of 100 cm. Both sides of main chamber 31 are blocked by two cup flanges 30 and 36. At the middle of each flanges 30 and 36, there is special port 29 and 37. Both sides of main chamber 31 are covered by flanges 30 and 36 and there is no port except two special ones 29 and 37.

In apparatus No. 3, around main chamber 31 is covered by a covering 32 made of ceramic and thermal insulation. Between ceramics and near the main chamber 31, there are thermal elements 33 for heating the wall and space inside the main chamber 31. Thermal elements 33 work with electric current and their temperature is controlled by a controller 43.

Base material 6 is settled into a ceramic boot 38 which is movable and can be removed by opening one of flanges 30 and 36 and then base material is located into it. One or more base materials 6 (substrate) can be settled inside the ceramic boot 38.

Apparatus No. 3 is made so that it can produce most temperature and heat caused by thermal elements 33 in central part and at the middle of main chamber 31. Insulated part and ceramics ensure that heat is not penetrated out of body.

To grow carbon nanostructures (carbon nanowalls), two main operations are done inside the main chamber 31. A First phase is of preparing the base material 6 and a second phase is of growing carbon nanowalls on the base material 6. First phase is performed by using one non-hydrocarbon gas or two non-hydrocarbon gases and second one by diluted hydrocarbon gases.

Gas is entered into main chamber 31 through path 39 connected to apparatus No 2. In path 39, there is no temperature change for gas and this gas is same one excluded from apparatus No 2. In path 40, gas is warmed by heat caused by thermal elements 33. Gas reaches the heating and radical region 35 through path 40 where gas is heated as much as possible and begins to make radical, then it is entered into the reaction region 34. In this region, there is maximum heat. Ceramic boot 38 in which there is base material 6 is put in the reaction region 34. In same region, radicalized and also heated gases contact the surface of base material 6. Then gases which do not react with the surface of base material 6 go to path 41 along with main chamber 31. In path 41, gases lose their heat. Path 41 in located on the main chamber 31 and back of flange 36. Finally gases leave the chamber through special port 37 and path 42. Gas excluded from the path 42 is cooled and non-radicalized one.

In apparatus No. 3, in first phase, the surface of base material 6 inside the ceramic boot 38 is prepared by using non-hydrocarbon gases. Accordingly at the first, base material 6 is put into ceramic boot 36, then ceramic boot 38 is settled at the middle of main chamber 31 and then flanges 30 and 36 are blocked. Then to exclude air from inside the main chamber, Argon gas with current 100 sccm is entered into main chamber 31 through path No 39 and 40 and also port 29 under temperature of 20° C. Air leaves the main chamber 37 through path 41, 42 and also port 37. Main chamber reaches a temperature of 300° C. by using thermal elements 33. When temperature of main chamber 31 is 300° C., non-hydrocarbon gas (H2) enters into the main chamber 31. Gas H2 with current 100 sccm is entered into apparatus No. 2 and then into the main chamber 31 through path 39 and 40 and special port 29 and is heated inside the main chamber 31 up to 300° C. and passes on the base material 6. At the same time, the surface of the base material 6 contacts with molecules H2 heated up to 300° C. and gets prepared. Then gas is cooled through path 41 and excluded through path 42. Gas H2 with current 100 sccm is entered into the chamber during 30 minutes and the main chamber 31 reaches 500° C. for 30 minutes. Non-hydrocarbon gases (N2 and NH3) are mixed by apparatus No. 2 and entered into the main chamber 31 through path 39 and 40 and also port 29. Gas NH3 with current 100 sccm and gas H2 with current 100 sccm is entered into apparatus No. 2 and mixed together. This mixture is entered into apparatus No. 3 and heated inside the main chamber 31. Mixture of NH3 and H2 is heated in the heating and radicalizing region 35 and there will be radicals formed and then in the reaction region 34, heated radicals and molecules are put on the surface of base material 6 and contacted with each other inside the ceramic boot 38 to provide the surface for growing carbon nanowalls. Then hot and non-reacted gases are cooled through path No 41 and leave the main chamber through path 42 and port 37.

By applying apparatus No. 3 in the second phase, carbon nanostructures are grown on the surface of base material 6. Then Argon gas with current of 100 sccm in entered into apparatus No. 2 and the main chamber 31 through path 39 and 40 and also through port of 29 respectively. This gas is applied to exclude non-hydrocarbon gases caused by the previous phase inside the apparatus No. 2 and main chamber No. 3. Then the reaction chamber reaches 600° C. by using thermal elements 33 and so operation continues under 500° C. for 30 minutes. Hydrocarbon gas (C2H2), H2 and NH3 are entered into apparatus No. 2 as much as 20 sccm, 100 sccm and 80 sccm respectively and then leave the chamber through path 26 and port 20 and enter into the main chamber 31 through path 39 and 40 and also port 29. As gas mixture NH3/H2/C2H2 enters into the main chamber 31, this mixture is heated in the heating and radicalizing region 35 and so the radials are produced. Then in the reaction region 34, mixture of gases forms radicals as much as necessary and contacts with the surface of the base material 6 located inside the ceramic boot 38.

Carbon radicals in region 34 react with the surface of base material 6 covered with metal materials. Next, non-reacted and hot gases move to path 41 and radicals are mixed together and gases are cooled and then leave the main chamber 31 through path 42 and port 37. In region 34, radicals react with the surface of base material 6 under 600° C. during 45 minutes. After 45 minutes, flow of C2H2 and H2, NH3 is blocked and electricity is decreased and stopped by controller of current 43 which controls electric current of thermal elements 33 so that main chamber 31 begins to cool. In this case, Argon gas with current of 100 sccm is entered to apparatus No. 2 through a source and then to apparatus No. 3 to exclude all remaining gases. This gas will be existed to reach 200° C. Then the flow of Argon is blocked and base material 6 inside the ceramic boot 38 is grown and leaves the chamber by reaching ambient temperature.

Now experiments performed in this invention are descry substrate: it should be noted that these experiments are based on two separate techniques of which first one is related to mark the layer of metal catalysts on the base material 6 as nanolayers and second is related to prepare and grow carbon nanostructures on the base material 6. The base material 6 goes to apparatus No. 3 by apparatus No. 1 after making the layer. So at the first we define experiments performed by apparatus No. 1 for making the layer of catalyst on the base material and then describe experiments of growing the carbon nanostructures by using apparatus No. 3.

Experiment 1: This experiment aims to making the layer of catalyst aluminum (Al) on the glass base material 6 which is done by apparatus No. 1. In this experiment, base material 6 (substrate) is cleaned by using acetone, alcohol and distilled and deionized water for 10 minutes in ultrasonic bath to remove all impurities. Then base material 6 is settled in apparatus No. 1 on the anode 4 and cathode 5 iron is located on its place. Then the chamber is blocked by using two flanges 2 and 3. The set will be prepared to make plasma. To do it, at the first, there should be the vacuum in the chamber 1 up to $10^{-5}$ ton and then to make plasma and ionized gases, Argon gas (Ar) is entered into the system through pore 9 and path 14 to reach the chamber's vacuum 0.03 torr. In this case, to concentrate the plasma in the plasma making region 11, there will be a magnetic field produced by using magnetic field 8 arranged by source 13. At the same time, cathode 5 receives voltage by source 12 during 3 minutes and current 200 mA will be made. After 3 minutes, the system will be turned off and base material 6 on which there is a layer of catalyst, is removed.

Experiment 2: This is same as experiment 1 except for using cathode 5 Iron (Fe) instead of using cathode 5 Iron.

Experiment 3: In this experiment like experiment 1, same system is applied except for making the second layer on the base material 6 to have the base materials 6 with two different catalyst layers. So base material 6 marked by iron is settled in apparatus No. 1 and then operation is continued same as experiment 1 to have the base material 6 with two different layers so the base material 6 with two nano-layers (aluminum layer on the iron layer) in the presence of argon gas is made.

Experiment 4: In this experiment like experiment 2, same system is applied except for making the second layer on the base material 6 to have the base materials 6 with two different catalyst layers. So base material 6 marked by Aluminum is settled in apparatus No. 1 and then operation is continued same as experiment 2 to have the base material 6 with two layers therefore the base material 6 with two nano-layers (iron layer on the aluminum layer) in the presence of argon gas is obtained.

Experiment 5: This is same as experiment 1 except for using Nitrogen gas instead of Argon gas to make plasma.

Experiment 6: In this process, carbon nanowalls are grown and acetylene, hydrogen and ammonia gases are employed as carbon source and non-hydrocarbon gases respectively to make the surface ready and also to dilute hydrocarbon gas. In this experiment, growing the carbon nanowalls on the base material 6 covered by Iron (experiment 2) as catalyst is studied by using apparatus No. 3. Temperature for growth and preparing the surface is 600° C. and 300-500° C. respectively. In this experiment, at the first, base material 6 is settled in a ceramic boot 38 and then conducted to the reaction chamber 31 so that it is located at the middle of reaction chamber 31 in reaction region 34. Then flanges (30 and 36) of the reaction chamber 31 should be blocked and joint between apparatus No. 2 and No. 3 be connected to port 29 of apparatus No. 3 through port 20 of apparatus No. 2. Then joint of hydrocarbon and non-hydrocarbon gases is connected to the gas source through ports 17, 18, 19, 27 and 20 of apparatus No. 2 and also excess gas is removed through port 29 of apparatus No. 3. After installing joints, at the first Argon gas with 200 sccm gas is entered into the chamber 16 of apparatus No. 2 through port 27 and path 22. Gas is entered into the reaction chamber 31 through port 29 and paths No 26, 39 and 40 to exclude air of the reaction chamber 31. Finally this gas leaves the reaction chamber 31 through paths 41 and 42. At the same time temperature of reaction is 20° C. In next phase, faucet of Argon gas should be closed and of Hydrogen be opened so that hydrogen with current 100 sccm is entered into the chamber 16 of apparatus No. 2 through port 18 and path 24 and also into the reaction chamber 31 of apparatus No. 3 through port 29 and paths 26, 39 and 40. Now temperature inside the reaction chamber 31 reaches 300° C. by using electric source 43 and also thermal elements 33 located in a thermal insulation 32 around the reaction chamber 31. Hydrogen gas with current 100 sccm is entered into the reaction chamber 31 and heated in the heating and radicalizing region 35 and then entered into the region 34. In the region 34, hydrogen contacts with the surface of base material 6 covered with metal nano-layers as catalyst and these operations are done under temperature 300° C. with current 100 sccm of H2 gas for 30 minutes.

Excess gas is removed through paths 41 and 42 and also port 37. At the end, faucet of ammonia gas is opened and ammonia gas with current 100 sccm is entered into the chamber 16 of apparatus No. 2 through port 17 and path 25 and mixed by passing through netted plates 21 and finally mixture of gas H2/NH3 with current 100/100 sccm leaves the apparatus No. 2 through port 20 and path 26 and enters to the reaction chamber 31 through port 29 and paths 39 and 40. As mixture of gas NH3/H2 enters into the reaction chamber 31, it is heated in the heating and radicalizing region 35 and radicals will be produced. In the reaction region 34, as the quantity of radicals produced is increased and contact with the metal nanolayers as catalyst and make the surface ready for next processes. This operation with mixture of gas 100/ 100 sccm NH3/H2 continues under 500° C. for 10 minutes. Excess gas leaves the reaction chamber 31 through paths 41 and 42 and also port 37. At the end, faucet of ammonia gas and hydrogen should be closed and of argon is opened again so that argon is entered into apparatus No. 2 and No. 3 same as first process, but there is a difference: in this phase, argon gas, temperature of the reaction chamber 31 and time are 100 sccm and 500° C. and 10 minutes respectively. In next phase (growing the carbon nanostructures), faucet of Argon gas is closed and of C2H2 is opened so that C2H2 with current 20 sccm is entered into the chamber 16 of apparatus No. 2 through port 19 and path 23. At the same time, H2 with current 100 sccm and ammonia with current 80 sccm is entered into the chamber 16 of apparatus No. 2 through ports 18 and 17 and also paths 24 and 25 respectively. C2H2, H2 and NH3 with current 20, 100 and 80 sccm are entered into the chamber 16 of apparatus No. 2 and are mixed together by passing through netted plates 21. Mixture of gases C2H2/NH3/H2 with current 20/80/100 Sccm is removed through port 20 and path 26 and entered into the reaction chamber 31 of apparatus No. 3 through port 29 and paths 39 and 40. After entering mixture of gases into the reaction chamber 31, it will be heated in the heating and radicalizing region 35 and then goes to the reaction region 34. This leads to make radicals so contacted with the surface of base material 6 covered with metal nanolayers as catalyst. Carbon radicals produced by C2H2 contact together on the base material 6 and make carbon nanostructures. Excess gases and radicals leave the reaction chamber 31 of apparatus No. 3 through paths 41 and 42 and also port 37. This operation is done with gas current 20 sccm for C2H2, 80 sccm for ammonia and 100 sccm for Hydrogen under 600° C. and for 45 minutes. At the last phase, faucet of C2H2, NH3 and H2 is closed and temperature is decreased by using electricity controller. In this case, after closing faucet of gases, argon with current 100 sccm is entered into the reaction chamber until the temperature of the reaction chamber reaches 20° C. Then the sample is brought out of reaction chamber 31 and ceramic boot 38.

Figure 4:
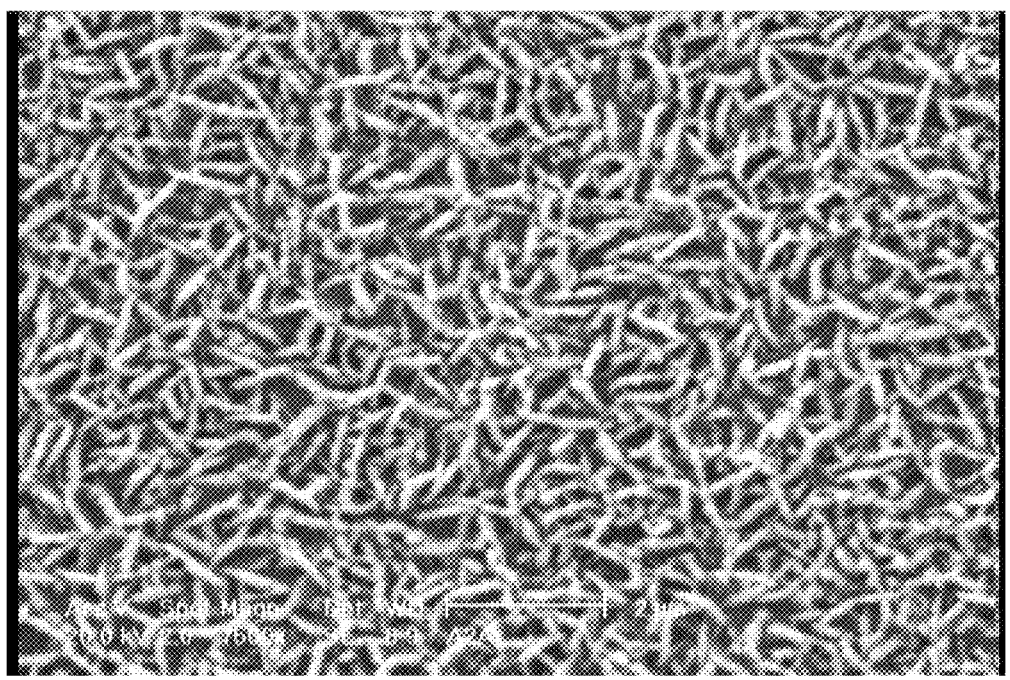
FIG. 4 is a SEM image of carbon nanostructures, produced in Experiment 6.
Figure 5:
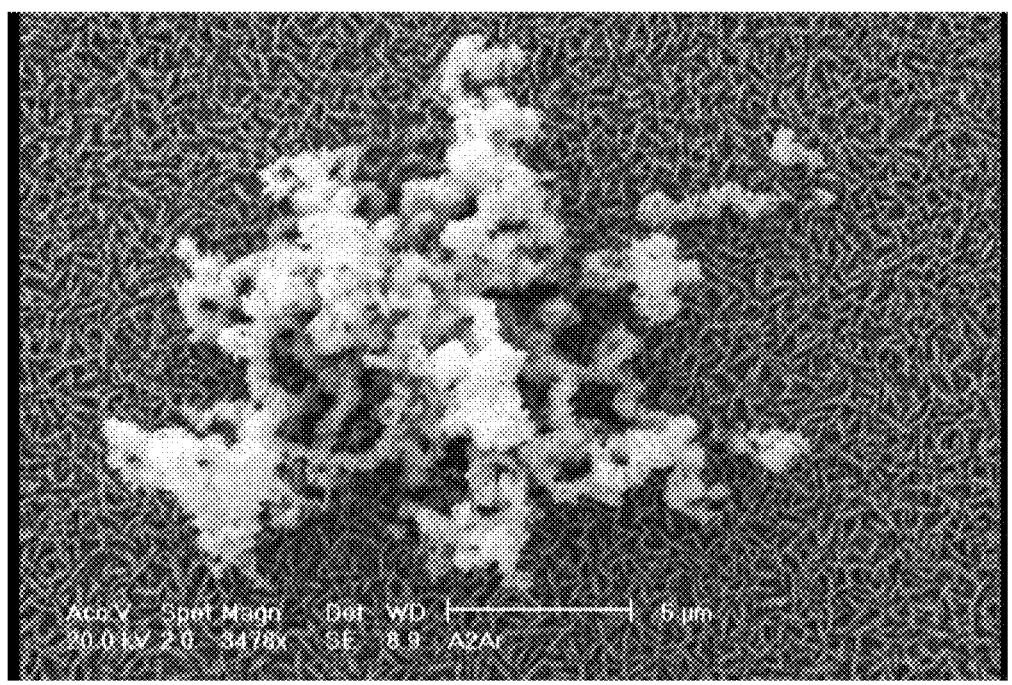
FIG. 5 is a SEM image of carbon nanostructures, produced in Experiment 6.

After testing the processes related to carbon nanostructure growth, to identify carbon nanostructures in this experiment, Scanning Electron Microscopy (SEM) has been used and whose pictures are offered in FIGS. 4, 5. These nanowalls have grown vertically in two dimensional surfaces.

Experiments 7: This is same as experiment 6 but there is a difference: in experiment 6, the base material 6 was covered with iron nanolayer in the presence of argon (experiment 2) used as catalyst on the substrate 6 for growing carbon nanostructures; but in next one, base materials 6 was covered with two different nano-layers aluminum layer on the iron layer (experiment 3) as catalyst are applied.

Figure 6:
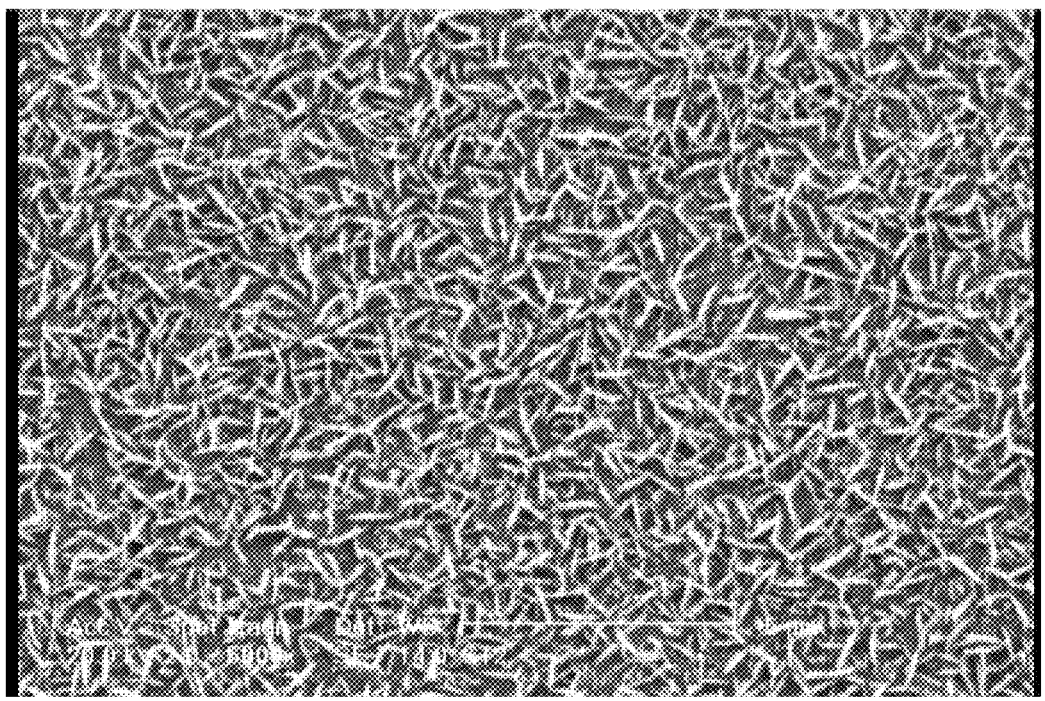
FIG. 6 is a SEM image of carbon nanostructures, produced in Experiment 7.
Figure 7:
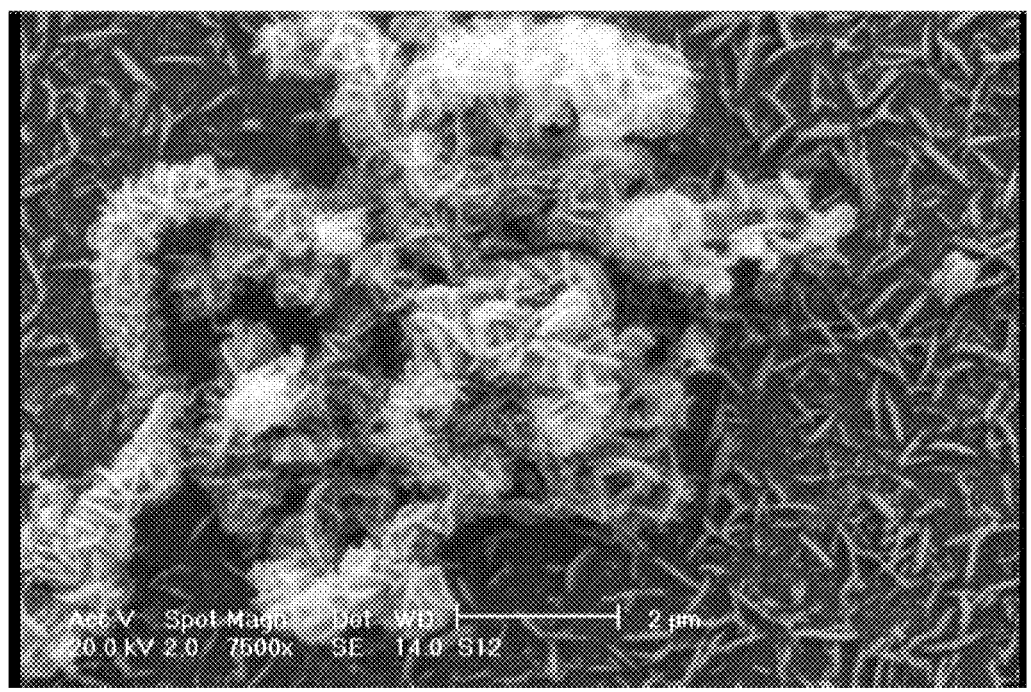
FIG. 7 is a SEM image of carbon nanostructures, produced in Experiment 7.
Figure 8:
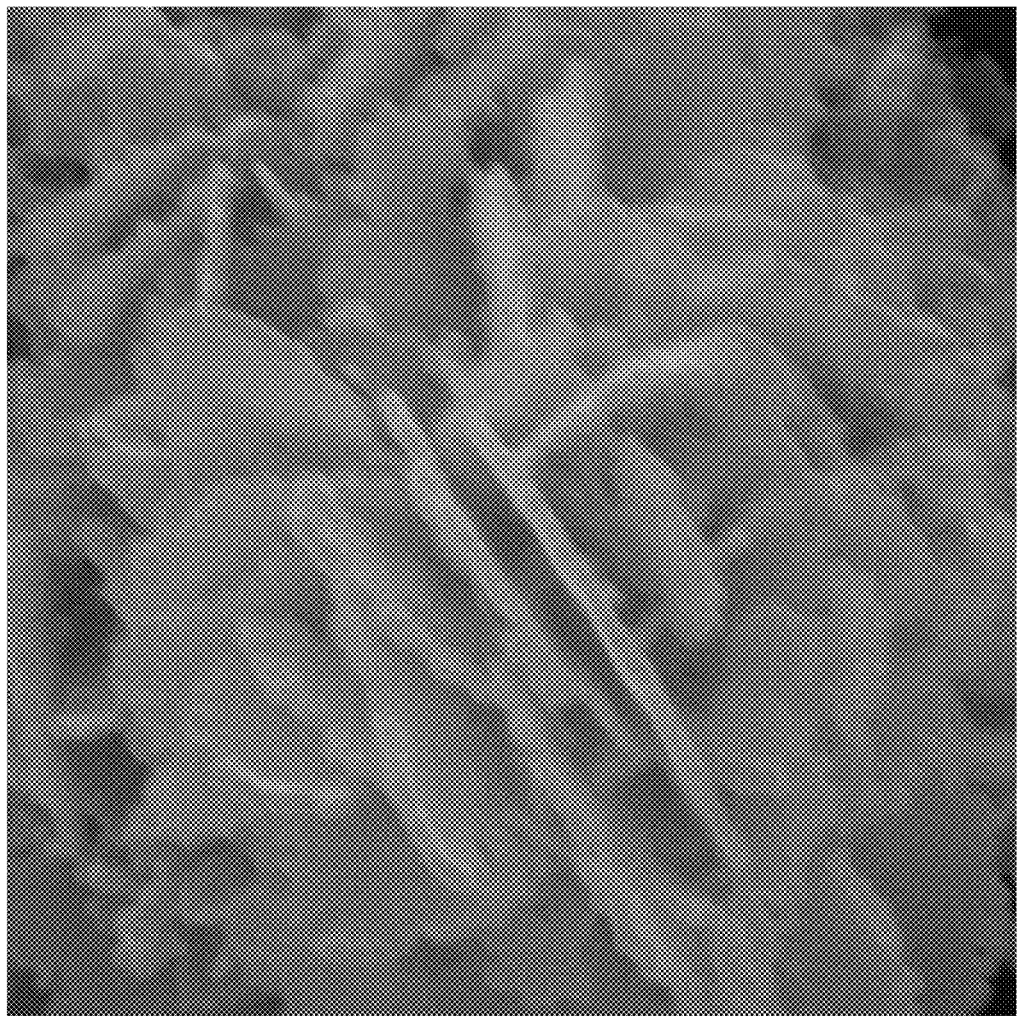
FIG. 8 is a SEM image of carbon nanostructures, produced in Experiment 8.
Figure 9:
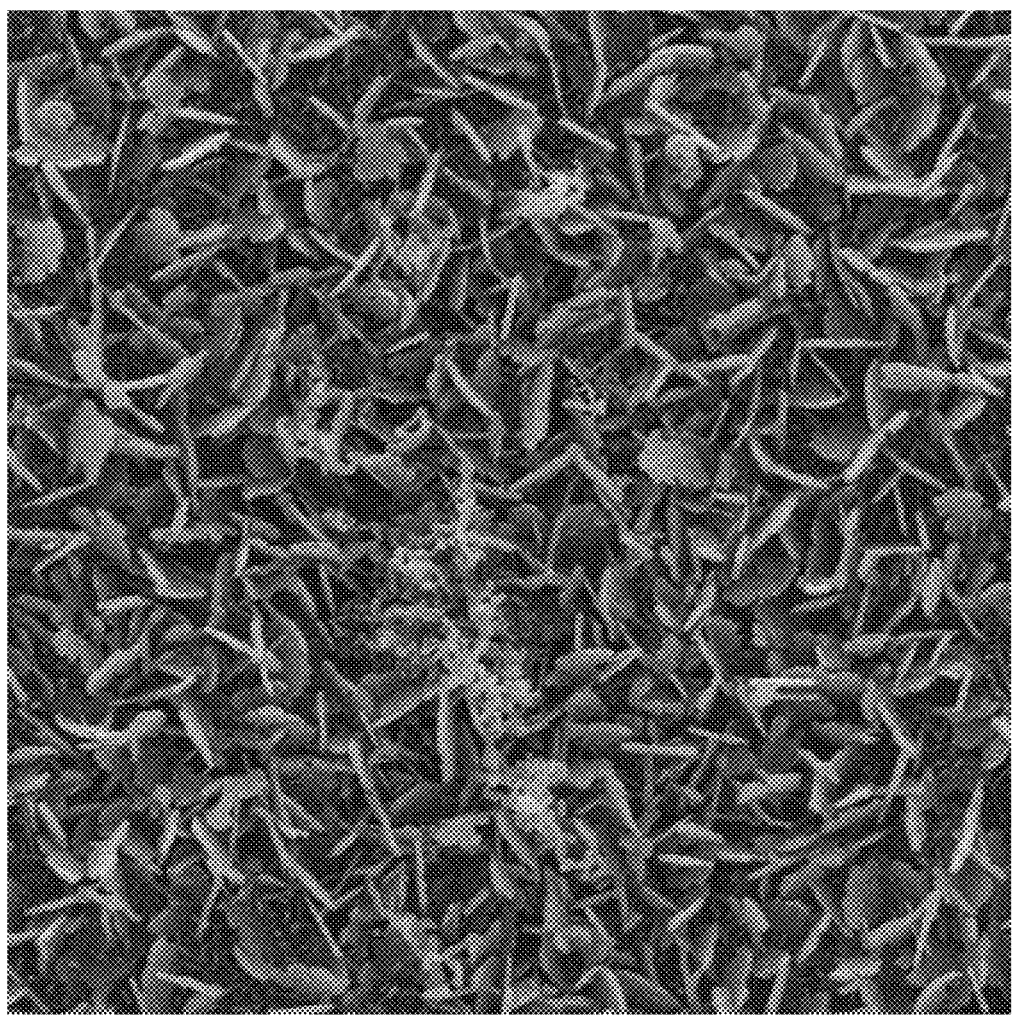
FIG. 9 is a SEM image of the carbon nanostructures, produced in Experiment 8.
Figure 10:
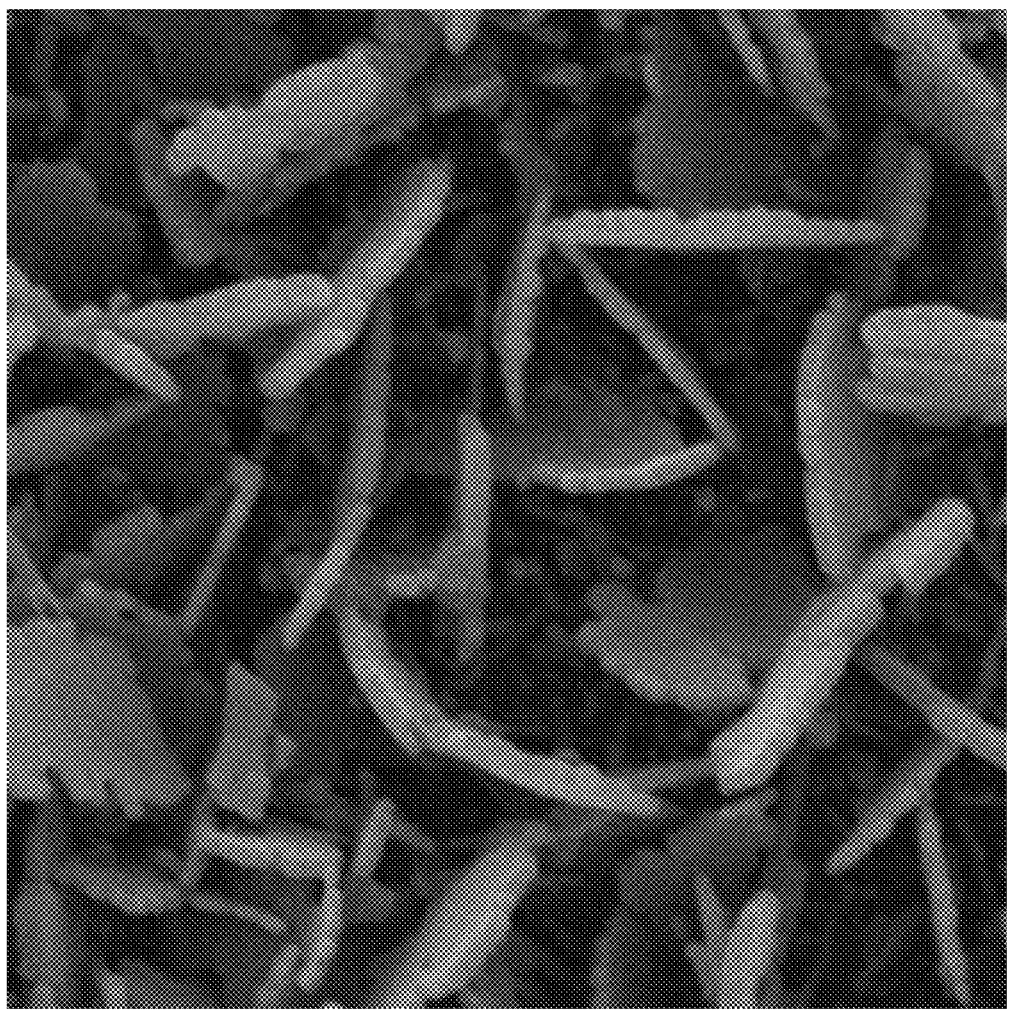
FIG. 10 is a SEM image of the carbon nanostructures, produced in Experiment 8.
Figure 11:
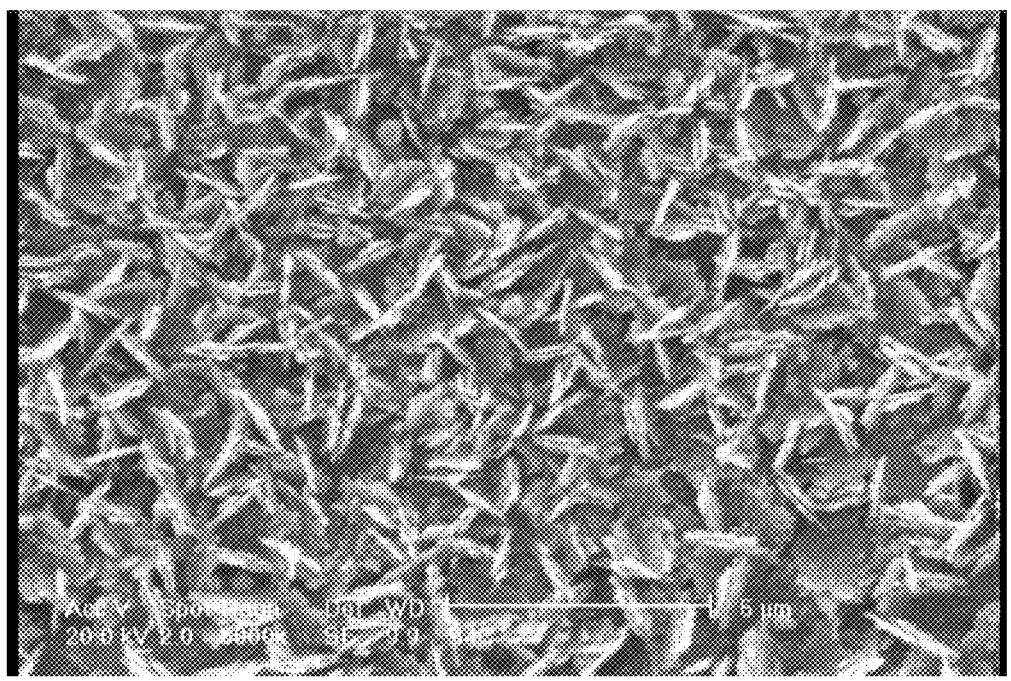
FIG. 11 is a SEM image of the carbon nanostructures, produced in Experiment 9.

After testing the processes related to carbon nanostructure growth, to identify carbon nanostructures in each experiment, Scanning Electron Microscopy (SEM) has been used and whose pictures are offered in FIGS. 6, 7. These nanowalls have grown vertically in two dimensional surfaces.

After performing primary processes related to growing and identify substrates 6 covered with suitable catalyst, suitable catalysts are selected to grow carbon nanowalls. These substrates will be tested so that we can identify the parameters affecting on the growth. These parameters are special for studying growth temperature, time, and carbon source gas flow.

Experiment 8, 9: In these experiments, changing of the growing temperature is studied. All growth parameters and experiment processes are same as experiment 6 and just growth temperature of carbon nanostructures is increased from 600 to 700° C. Substrates 6 covered with suitable catalyst is selected from among experiments 1-5. In this experiment, substrate 6 covered with aluminum nanolayer (experiment 1) and two nanolayers iron on aluminum (experiment 4) has been applied as catalyst.

After testing the processes related to carbon nanostructure growth, to identify carbon nanostructures in each experiment, Scanning Electron Microscopy (SEM) has been used and whose pictures are offered in FIGS. 8-11. These nanowalls have grown vertically in two dimensional surfaces.

Experiment 10: In this experiment, change in the growing time is studied. All growth parameters and experiment processes are same as experiment 6 and just growth time of carbon nanostructures has been increased from 45 to 60 minutes. Substrates 6 covered with suitable catalyst have been selected from among the experiments 1-5. In this experiment, substrate 6 covered with iron nanolayer (experiment 2) has been applied as catalyst.

Figure 12:
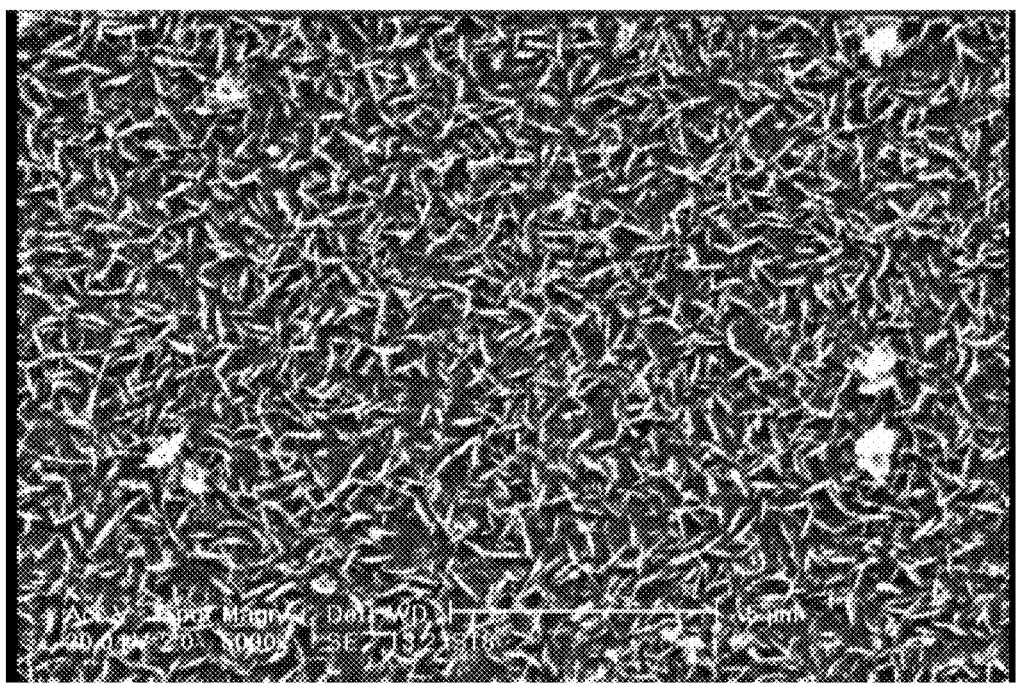
FIG. 12 is a SEM image of the carbon nanostructures, produced in Experiment 10.
Figure 13:
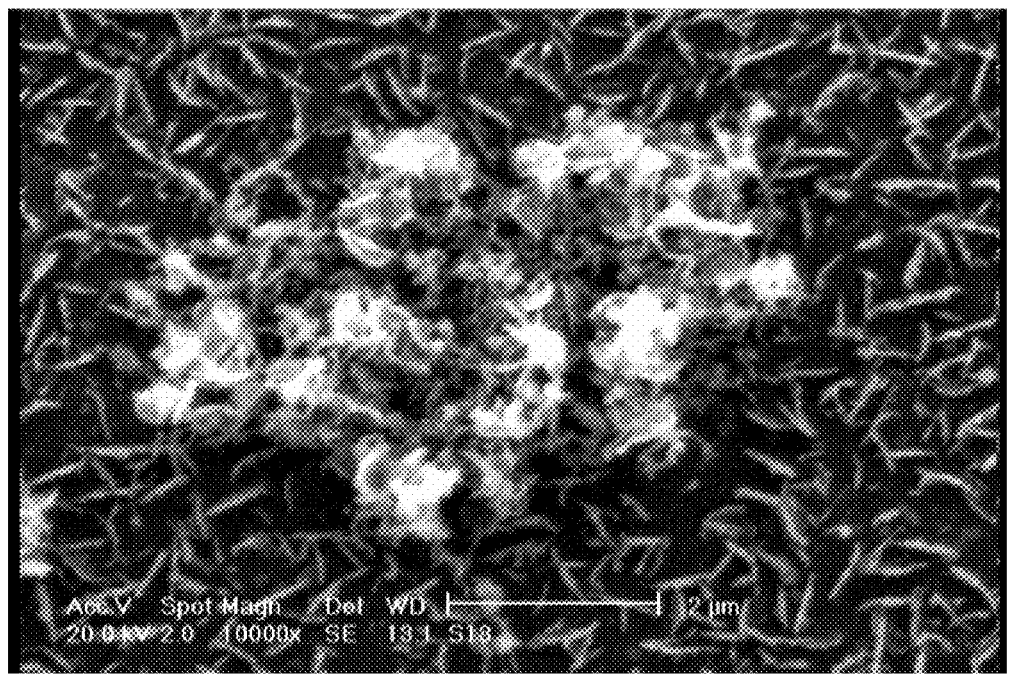
FIG. 13 is a SEM image of the carbon nanostructures, produced in Experiment 10.

After testing the processes related to carbon nanostructure growth, to identify carbon nanostructures in each experiment, Scanning Electron Microscopy (SEM) has been used and whose pictures are offered in FIGS. 12, 13. These nanowalls have grown vertically in two dimensional surfaces.

Experiment 11: In this experiment, change in the hydrocarbon gas flow is studied. All growth parameters and experiment processes are same as experiment 6 and just hydrocarbon gas flow has been increased from 20 to 48 sccm. Substrates 6 covered with suitable catalyst have been selected from among the experiments 1-5. In this experiment, substrate 6 covered with aluminum nanolayer (experiment 5) has been applied as catalyst.

Figure 14:
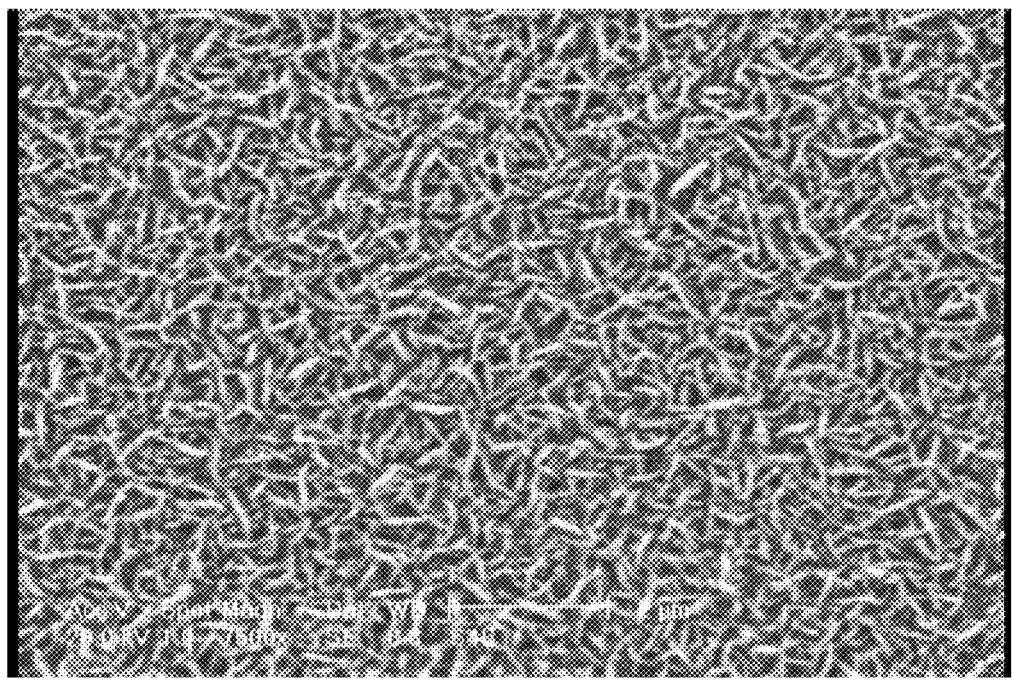
FIG. 14 is a SEM image of the carbon nanostructures, produced in Experiment 11.
Figure 15:
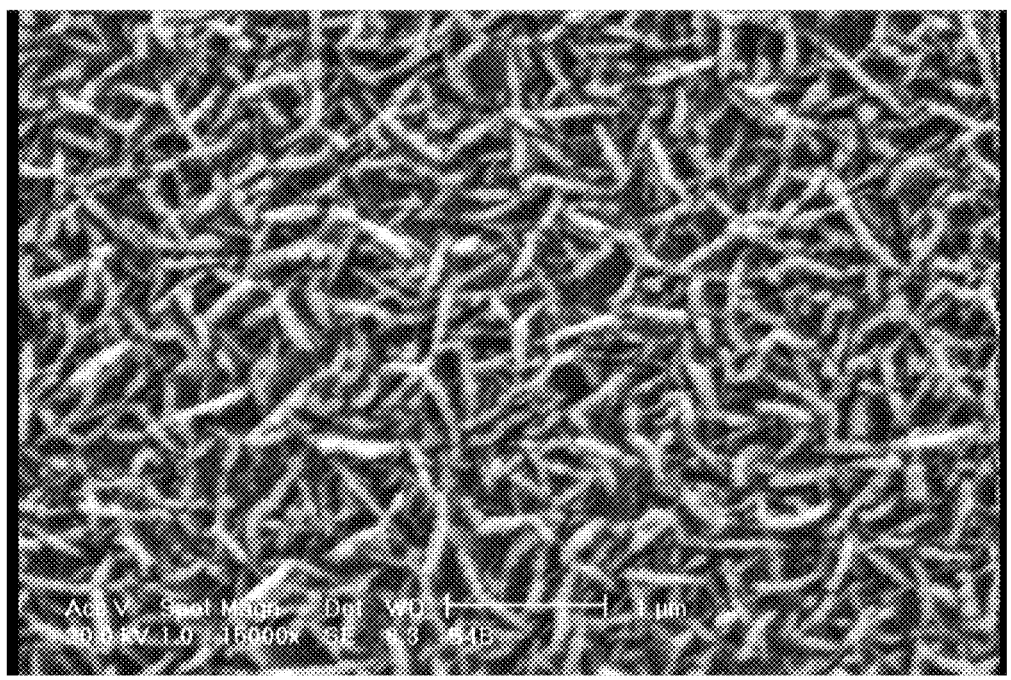
FIG. 15 is a SEM image of the carbon nanostructures, produced in Experiment 11.

After testing the processes related to carbon nanostructure growth, to identify carbon nanostructures in each experiment, Scanning Electron Microscopy (SEM) has been used whose pictures are offered in FIGS. 14, 15. These nanowalls have grown vertically in two dimensional surfaces.

Items offered in this invention are considered as examples and this invention is not limited to same examples. Recent invention includes substrates 6 covered with different metal materials as catalyst and also applying hydrocarbon gas as carbon source gas and using different gases or combination of gases to make plasma of apparatus No 1. In this invention, plasma has not used to grow carbon nanowalls and nanostructures. In this invention, base material 6 is microscopic glass; and carbon nanostructures are grown under atmosphere pressure and vacuum has not been employed.

This invention includes a simple method to grow carbon nanowalls and applying catalyst characteristics of nanolayers with different metals and also using various parameters.

The invention has been described in connection with its preferred embodiments. However, it is not limited thereto. Changes, variations and modifications to the basic design may be made without departing from the inventive concepts in this invention. In addition, these changes, variations and modifications would be obvious to those skilled in the art having the benefit of the foregoing teachings. All such changes, variations and modifications are intended to be within the scope of the invention which is limited only by the following claims.

What is claimed is:

1. A method for growing carbon nanowalls on a base material including a first end and a second end, wherein said method consists of:

mixing a predetermined amount of a hydrocarbon gas with a predetermined amount of one or more non hydrocarbon gases wherein said hydrocarbon gas is an acetylene gas, and wherein said one or more non-hydrocarbon gases are selected from a group consisting of an ammonia gas and a hydrogen gas, and wherein said predetermined amount of said hydrocarbon gas is 20 sccm, and wherein said predetermined amount of said ammonia gas is 80 sccm and wherein said predetermined amount of said hydrogen gas is 100 sccm;

preparing said base material by coating said base material with a thin film of a metal catalyst, wherein said metal catalyst is selected from a group consisting of iron, copper, aluminum and combination thereof;

placing said prepared base material in a reaction chamber having a first portion and a second portion, wherein said first portion is extended from a first end of said reaction chamber to a first end of said prepared base material;

entering said mixed hydrocarbon gas and said one or more non-hydrocarbon gases into said reaction chamber;

creating a plurality of first radicals in said reaction chamber based on said predetermined amount of said hydrocarbon gas and said predetermined amount of said one or more non hydrocarbon gases, wherein said plurality of first radicals comprise hydrocarbon radicals and non hydrocarbon radicals, and wherein said step of creating said first radicals consists of heating walls in said reaction chamber by using an external thermal source and wherein said external thermal source is employed around said reaction chamber and wherein said external thermal source is a plurality of thermal elements which are covered by ceramic, and wherein said first radicals are selected from a group consisting of a hydrogen radical, a nitrogen radical, a carbon radical and a combination thereof, wherein said step of creating hydrogen radical, nitrogen radical and carbon radical comprises heating at least one radical source by heating walls and inside area of said reaction chamber by using an electric oven and by making said at least one radical source to contact hot walls of said reaction chamber wherein said at least one radical source is selected from a group consisting of a hydrogen, a nitrogen, a carbon and a combination thereof, and wherein said step of creating first radicals consists of controlling a concentration level of said first radicals in said reaction chamber by controlling a ratio of an amount of said hydrocarbon gas rate and an amount of said non hydrocarbon gas rate in said reaction chamber and by controlling a temperature in said reaction chamber and wherein said temperature is controlled to be within 300-700° C. and wherein said temperature is controlled to be preferably within 500-600° C.;

applying said plurality of first radicals to said prepared base material; and growing carbon nanowalls on said prepared base material based on said hydrocarbon radical, and wherein said step of growing carbon nanowalls consists of growing carbon nanowalls having irregular location and angles extended vertically to increase hydrogen storage in fuel cells on said base material.

2. The method according to claim 1, wherein said hydrocarbon radicals are carbon radical and hydrogen radical.

3. The method according to claim 1, wherein said non hydrocarbon gas is selected from a group consisting of nitrogen, hydrogen and a combination thereof.

4. The method according to claim 1, wherein said thin film of metal catalyst is formed in a single layer.

5. The method according to claim 1, wherein said base material is made up of microscopic glass and wherein said microscopic glass is selected from a group consisting of Cu—Al-glass, Cu—Fe-glass, Al—Cu-glass, Fe—Cu-glass, and Fe—Al-glass.

6. The method according to claim 1, wherein said thin film of metal catalyst is formed in two layers.

7. The method according to claim 6, wherein said two layers of thin film metal catalyst are formed with mutually different catalysts.

8. An apparatus for growing carbon nanowalls on a base material, including a first end and a second end, wherein said apparatus consists of:
- a means for mixing a predetermined amount of a hydrocarbon gas with a predetermined amount of one or more non hydrocarbon gases, wherein said means for mixing is a mixer chamber, and wherein said hydrocarbon gas is acetylene gas, and wherein said one or more non-hydrocarbon gases are selected from a group consisting of ammonia gas and hydrogen gas, and wherein said predetermined amount of said hydrocarbon gas is 20 sccm, and wherein said predetermined amount of said ammonia gas is 80 sccm and wherein said predetermined amount of said hydrogen gas is 100 sccm, and wherein said mixer chamber has faucets to control an amount of said hydrocarbon gas rate and an amount of said non hydrocarbon gas rate to control a density of radicals produced in said reaction chamber;
- a reaction chamber for placing said base material, wherein said reaction chamber has a radical region and a reaction region, and wherein said base material is placed in said reaction region in a ceramic boot and wherein said base material has a first portion and a second portion, wherein said first portion is extended from a first end of said reaction chamber to a said first end of said base material, and wherein said reaction chamber consists an external thermal source which is arranged around said reaction chamber for heating walls of said reaction chamber and inside of said reaction chamber for heating a first radical source for creating said first radicals by using pyrolysis in said reaction chamber, wherein said external thermal source around said reaction chamber is a thermal element;
- a means for creating first radicals in said reaction chamber based on said predetermined amount of said hydrocarbon gas and said predetermined amount of said one or more non hydrocarbon gases, wherein said means for creating said first radicals is a radical generator comprising an electric oven, and wherein said one or more non hydrocarbon gases are selected from a group consisting of nitrogen, hydrogen and a combination thereof, and wherein said first radicals comprise of hydrocarbon radicals and non hydrocarbon radicals wherein said hydrocarbon radicals comprise a carbon radical and hydrogen radical;
- a means for applying said first radicals to said base material, and growing carbon nanowalls on said base material based on said hydrocarbon radicals, and wherein said means for applying said first radicals is a ceramic boot.

9. The apparatus as claimed in claim 8, wherein said first radicals are selected from a group consisting of a hydrogen radical, a nitrogen radical, a carbon radical and a combination thereof.

10. The apparatus according to claim 8, wherein said mixer chamber and said reaction chamber are separated from each other and said mixer chamber is located outside of said reaction chamber.

11. The apparatus according to claim 8, wherein said reaction chamber is a cylinder made up of quartz.

* * * * *